Aug. 28, 1956
A. A. SCHAAF
2,760,643
LEACHING BED
Filed April 12, 1954
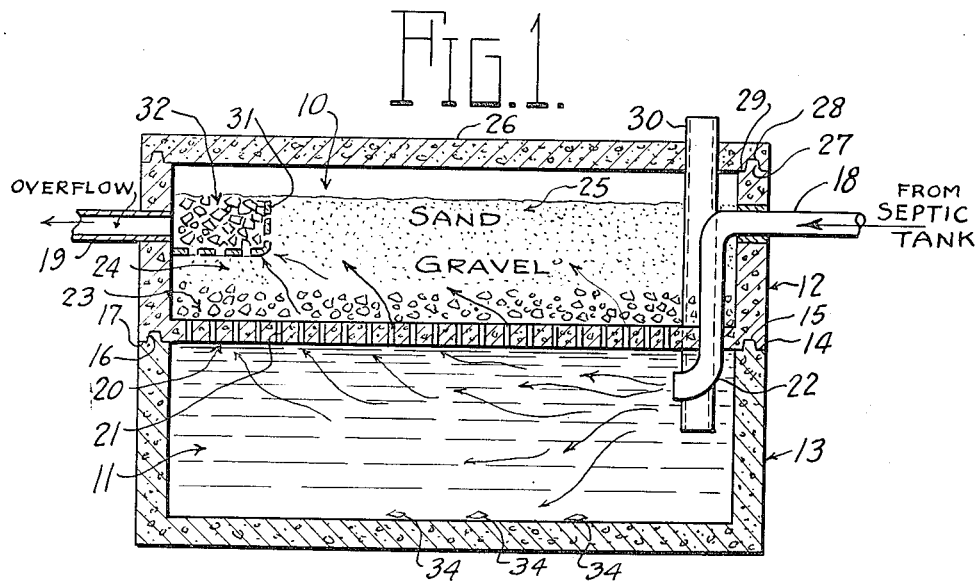
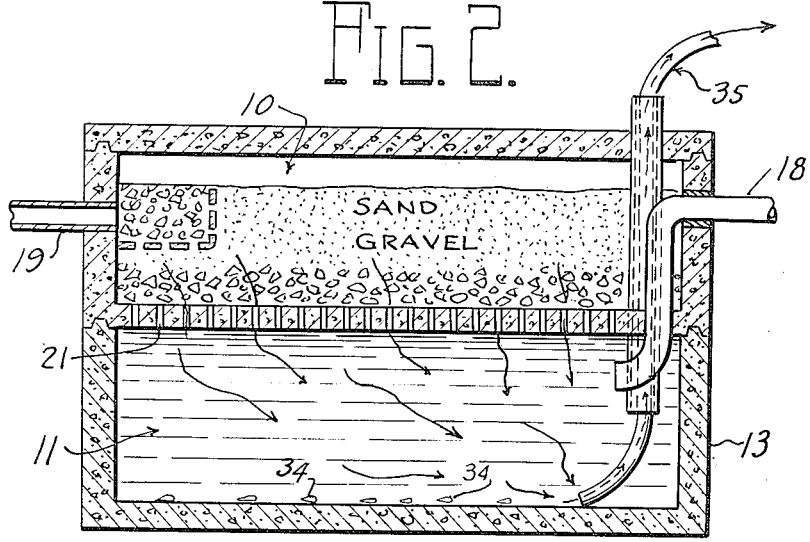
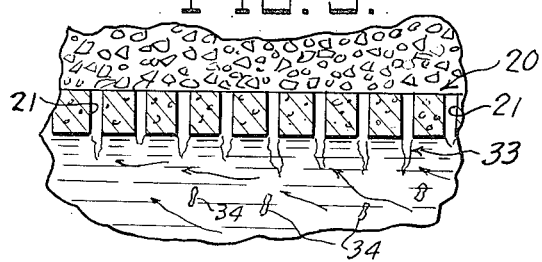
INVENTOR.
Arthur A. Schaaf
BY
Owen & Owen
ATTORNEYS United States Patent Office 2,760,643
Patented Aug. 28, 1956

2,760,643

LEACHING BED

Arthur A. Schaaf, Lima, Ohio

Application April 12, 1954, Serial No. 422,430

1 Claim. (Cl. 210—144)

This invention relates to improvements in leaching beds of the type which are used for the clarification of effluent from a septic tank.

In most States and communities regulations covering rural areas where sewage systems do not exist and, thus, where septic tanks are employed, include the requirements for a leaching bed of large size to receive the overflow from a septic tank.

Such a leaching bed usually consists of a large area of crushed rock, large sized gravel and sand placed in a pit frequently as large as 20 by 30 or 40 feet to take care of the overflow of a septic tank of a farm dwelling. The runs through the leaching bed are usually made of soft tile or spaced tile, the theory being that the overflow will run down the tile and be distributed through the leaching bed for clarification. In practice, however, the majority of effluent distributes into the leaching bed through the first one or two tile joints in the leaching bed and thus a very small percentage of the total area and volume of the bed is used for the actual leaching that is done, the remainder of the mass of rock, gravel and sand being wasted insofar as its primary function is concerned.

Another serious difficulty with leaching beds constructed according to the general plan of merely digging an excavation and filling it with rock, gravel and sand and then covering the sand, is that it is impossible to clean the bed after it has been used for a number of years and is, perhaps, becoming clogging by overflowed solid matter or for other reasons it is becoming unsatisfactory.

It is, therefore, the principal object of this invention to provide an improved leaching bed wherein the entire mass, both in area and volume, of the gravel, rock and sand is employed for the clarifying process.

It is yet another object of this invention to provide an improved leaching bed construction which, since all of the filtering media is employed, can be of substantially smaller size for the leaching of the same volume of overflow than such beds as are commonly employed.

Yet another object of this invention is to provide a leaching bed so designed as to permit the fabrication of standard sizes which can be merely installed at a place of use rather than necessitating an excavation and construction on the spot of the leaching bed.

A still further object of the invention is to provide a leaching bed construction which can readily be cleaned or "backwashed" thereby restoring the bed to substantially new condition and, consequently, prolonging its useful life.

A still further object of the invention is to provide a leaching bed in which, if and when desired, the contained stone, gravel and sand can be easily and completely removed and replaced.

A still further object of the invention provides for the utilization of gravity in order to separate solid matter, if any, from the water flowing through the leaching bed so as to eliminate most of the clogging of the bed which might otherwise take place and to provide for the simple removal of the heavier material from the bed if and when any deleterious amount accumulates in the bed.

These and other and more specific objects and advantages will be better understood from the specification which follows and from the drawings in which:

Fig. 1 is a vertical sectional view of a leaching bed constructed according to the invention, there being flow arrows thereon depicting the direction of movement of the overflow water entering a leaching bed from a septic tank.

Fig. 2 is a view similar to Fig. 1 but illustrating the direction of movement of the water within the bed during a cleaning or "backwashing" operation.

Fig. 3 is a fragmentary enlarged vertical sectional view of a portion of the leaching bed shown in Figs. 1 and 2 and illustrating how solid matter in suspension may build up within a bed embodying the invention in such a manner as to have its eventual dispersion or removal facilitated.

A leaching bed embodying the invention comprises a pair of generally similar compartments 10 and 11, each of which is formed by an open topped enclosure 12 or 13, respectively. In the embodiment of the invention illustrated in the drawings, each of the enclosures 12 and 13 is formed from reinforced concrete which may be cast in different shapes and proportions as well as in different sizes, the only requirement being that the upper enclosure 12 should fit the lower enclosure 13 in a particular leaching bed.

In order to facilitate the assembly of the enclosures 12 and 13 an upper edge 14 of the lower enclosure 13 is formed with a tongue 15 which mates in a groove 16 formed in the lower edge 17 of the upper enclosure 12. The particular enclosures 12 and 13 of Figs. 1 and 2 may be considered to be generally rectilinear in shape although, of course, the vertical sections in Figs. 1 and 2 could equally well pertain to cylindrical enclosures and this and similar shapes may be employed if desired.

The walls of the lower enclosure 13 are imperforate and the reinforced concrete from which they are made should preferably be waterproof. The side walls of the upper enclosure 12 also are substantially imperforate except for openings to accommodate inflow and overflow pipes 18 and 19, respectively. A bottom 20 of the upper enclosure 12 is, however fabricated in a manner to form a series of perforations 21 or similar screening openings connecting the chambers 10 and 11.

The inflow pipe 18 leads from a conventional septic tank into the interior of the chamber 10 and then turns downwardly passing through the bottom 20 of the upper enclosure 12 and being fitted with an L or similar terminal portion 22 located just beneath the bottom 20 and directed to cause the flow of water across the top of the chamber 11, preferably just below the bottom 20 of the upper chamber 12.

A suitable mass of heavier crushed stone generally indicated at 23, is located in the bottom of the upper chamber 10 and a mass of finer stone or gravel 24 is spread on top of the rock 23 with the final material consisting of sand generally indicated at 25 spread over the top of the gravel 24 and filling the upper chamber 10 to within a relatively few inches of the top of the chamber 10.

The chamber 10 and thus the leaching bed as a whole may be closed by a reinforced concrete top 26 which, like the mating edges of the upper and lower enclosures 12 and 13, may be designed with a groove 27 around its perimeter which mates with a tongue 28 on an upper edge 29 of the walls of the upper enclosure 12.

A pump-out and breather pipe 30 extends downwardly through the lid 26 and the upper chamber 10 into the lower chamber 11. A small foraminous enclosure 31 may, if desired, be built around the location of the inner end of the overflow pipe 19 and it may be filled with gravel, for example, indicated at 32, in order to prevent any of the sand 25 from washed out the overflow pipe 19. In actual practice it may not be necessary to provide the foraminous enclosure 31 to contain the gravel 32 but a small mass of gravel may merely be positioned at the inner end of the overflow pipe 19 in the mass of sand and finer gravel.

The effluent from the septic tank which flows into the flow pipe 18 is directed by the L 22 across the top of the lower chamber 11 washing across the bottom surface of the perforate bottom 20 of the upper chamber 10. This washing action causes some of the effluent to sweep across the openings 21 through the bottom 20 as can perhaps best be seen in Fig. 3 and is desirable since it may break away small bits and particles of suspended matter which would otherwise tend to accumulate at the inflow sides of the openings 21. For instance, in Fig. 3 a plurality of depending "strings" of precipitated or carried matter are indicated at 33 with bits 34 being shown as washed away by the flow of water across the undersides of the openings 21. As the bits of matter 34 may be washed away, gravity causes them to drop through the mass of liquid in the lower chamber 11 finally coming to rest on the bottom of the lower enclosures 13 where continued flow action of the water tends to dissolve them and break them up until eventually they are carried with the mass of water upwardly through the openings 21 into the upper chamber 10. All liquid and solid matter effluent which enters the upper chamber 10 is leached by the rock, gravel and sand in the upper chamber 10 and, as the water level in the leaching bed rises, it eventually reaches a height such that it flows out of the upper chamber 10 through the overflow pipe 19.

Continued flow of the discharge from the septic tank takes place into the lower chamber 11 and gradually each inflowing charge of material passes upwardly through the leaching bed and out the overflow pipe 19. The particular path, of course, of any individual mass or particle entering the leaching bed through the inflow pipe 18 is entirely random and because the entire bed, including both the lower chamber 11 and upper chamber 10 remains full of water up to the overflow pipe 19, the material within the leaching bed can be considered to rise upwardly through the entire area of the bed. No flow channels are induced within the rock, gravel and sand as inevitably occurs where an overflow pipe is led through such a mass of material in an ordinary leaching bed and joints or separations between the tile provide for definite flow paths of the liquid.

After a leaching bed embodying the invention has been employed for a considerable period of time, the solid matter indicated at 33 in Fig. 3 may eventually substantially plug numbers of the openings 21 leading into the upper chamber 10. As this occurs a leaching bed embodying the invention can be "backwashed" to remove any such accumulation of material and to restore the bed to new condition. A "backwash" through the bed may be brought about by dropping a pump-out hose 35 downwardly through the breather pipe 30 until the end of the hose reaches the bottom of the chamber 11. By creating a vacuum on the hose 35 (see Fig. 2) the liquid in the upper chamber 10 is caused to flow downwardly through the openings 21 and the liquid in the lower chamber 11 pulled into the hose 35. This "backwashes" the openings 21, washing away any of the accumulation 33 of solid matter and removing it outwardly through the hose 35. The pump on the hose 35 is operated until virtually all of the liquid within the leaching bed and, consequently, virtually all of the solid matter in suspension therein or on the bottom of the chamber 11, are removed from the leaching bed. If a single pumping out operation is not deemed sufficient, clear water may, for example, be flowed into the breather pipe 30 until it overflows out the pipe 19 and then the "backwashing" may be performed a second time or possibly even a further number of times until the water overflowing through the pipe 19 is completely clear.

I have found that the use of a mass of glass fiber wool, laid in the upper chamber 10, either in lieu of, or in combination with, a quantity of sand, gravel or small stone provides an excellent filtering bed. The fibrous mass, like the sand or gravel, has the property of straining and filtering without reaction to the liquid effluent or the materials in solution or suspension therein and the overflow is clear and inoffensive.

The utilization of the entire area and volume of the rock, gravel and sand or other filtering medium, such as the mass of glass wool or other relatively inert material for the purposes of clarification results in it being possible to handle a septic tank through a leaching bed of the invention having an area and volume less perhaps than a quarter of that of an ordinary leaching bed handling the same septic tank.

Having described the invention, I claim:

A leaching bed for septic tank effluent, said bed comprising an upper compartment, a lower compartment each of said upper and lower compartments consisting of a unitary, hollow, open, open topped reinforced concrete casting, the upper edges of the walls of the lower casting and the joining edges of the walls of the upper casting having mating elements for positive alignment and joining, a perforated partition separating said compartments, a quantity of filtering medium substantially filling said upper compartment, an inflow pipe opening into said lower compartment at one side thereof and at a point just below said partition and directed to cause flow horizontally across the openings therein and beneath said partition, an overflow pipe leading out of said upper compartment at a point remote from said inflow pipe and at a level near the top of said filtering medium and an open ended imperforate clean-out pipe leading from above downwardly through said upper compartment and into said lower compartment for introducing a pumping hose thereinto.

References Cited in the file of this patent

UNITED STATES PATENTS

| 192,750 | Foley | July 3, 1877 |
| 1,463,102 | Stryker | July 24, 1923 |
| 2,083,132 | Williams et al. | June 8, 1937 |
| 2,416,867 | Coberly | Mar. 4, 1937 |
| 2,559,784 | Moore | July 10, 1951 |

FOREIGN PATENTS

| 26,013 | Great Britain | of 1908 |
| 405,197 | France | Dec. 22, 1909 |
| 615,164 | France | Dec. 31, 1926 |